United States Patent

Ericksen

Patent Number: 5,419,662
Date of Patent: May 30, 1995

[54] HINGE INSTALLATION TOOL

[76] Inventor: Colin W. Ericksen, 110 W. 6th Ave. #177, Ellensburg, Wash. 98926

[21] Appl. No.: 263,544

[22] Filed: Jun. 23, 1994

[51] Int. Cl.6 .................................. B23B 45/00
[52] U.S. Cl. ................................ 408/42; 408/53; 408/112
[58] Field of Search ............ 408/42, 52, 53, 88, 408/100, 110, 112

[56] References Cited

U.S. PATENT DOCUMENTS

| 513,088 | 1/1894 | Crane | 408/53 |
| 651,315 | 6/1900 | Schurman | 408/53 |
| 3,389,729 | 6/1968 | Macala | 408/53 |
| 4,572,715 | 2/1986 | Wolff | 408/112 |
| 5,085,543 | 2/1992 | Click | 408/53 |
| 5,217,331 | 6/1993 | Ericksen | 408/53 |

FOREIGN PATENT DOCUMENTS 2170753  8/1986  United Kingdom ............ 408/53

Primary Examiner—Daniel W. Howell

[57] ABSTRACT

A drilling device for boring holes in wood, plastic or metal in precise locations on a work piece, comprising a set of geared together shafts equipped with drilling bits. The bit holder shafts are guided by bearings housed in a frame biased upwardly by springs. The geared together shafts being powered by an electric drill motor.

1 Claim, 3 Drawing Sheets

HINGE INSTALLATION TOOL

FIELD OF INVENTION

This invention relates to cabinetry and arose from the need to drill holes, simultaneously in a work piece to accommodate the ribbed fastener dowels used on concealed hinge cabinetry hardware.

DISCUSSION OF PRIOR ART

The present methods for drilling for concealed hinge hardware involves either large machines capable of drilling three holes at a time or simple devices that drill only for the cup portion of the hinge or very inefficient small devices requiring the operator to drill one hole at a time. The present methods are either expensive or labor intensive.

To overcome the disadvantages of these methods, the present invention combines the efficiency of a large machine with the portability and economy of a small tool.

SUMMARY OF THE INVENTION

It is an object of the invention to drill holes simultaneously in a work piece with a multi-spindle portable device. The device may then be repositioned to drill additional holes.

Another object of the invention is the provision of both intermittent turnstops on opposite edges of the device's base and an adjustable guide fence mounted on the bottom surface of the base. The intermittent turnstops in combination with the guide fence allows the device to be positioned on the corner of a work piece.

A further object of the invention is a center locating window with a score line across the center of the window perpendicular to the device's guide fence, and protruding over a clearance hole in the device's base. Thus when the operator looks through the center locating window, the operator can locate the device to a mark on the work piece below.

A still further object of the invention is by using the center locating window in combination with the guide fence without employing the intermittent stops, the operator can locate the device along the edge of a work piece. This allows for drilling for a hinge in the middle of a tall door.

The principle object and essence of the device is, therefore, to provide a drilling assembly of the character here within described which enables a series of holes to be drilled at one time a given distance in from the edge and corner of a work piece or in from the edge only by using a reference mark on the work piece.

BRIEF DESCRIPTION OF THE DRAWINGS

Other objects and advantages of the invention will become more apparent from the specifications taken in conjunction with the accompanying drawings in which.

DETAILED DESCRIPTION OF THE INVENTION

Figure 1:
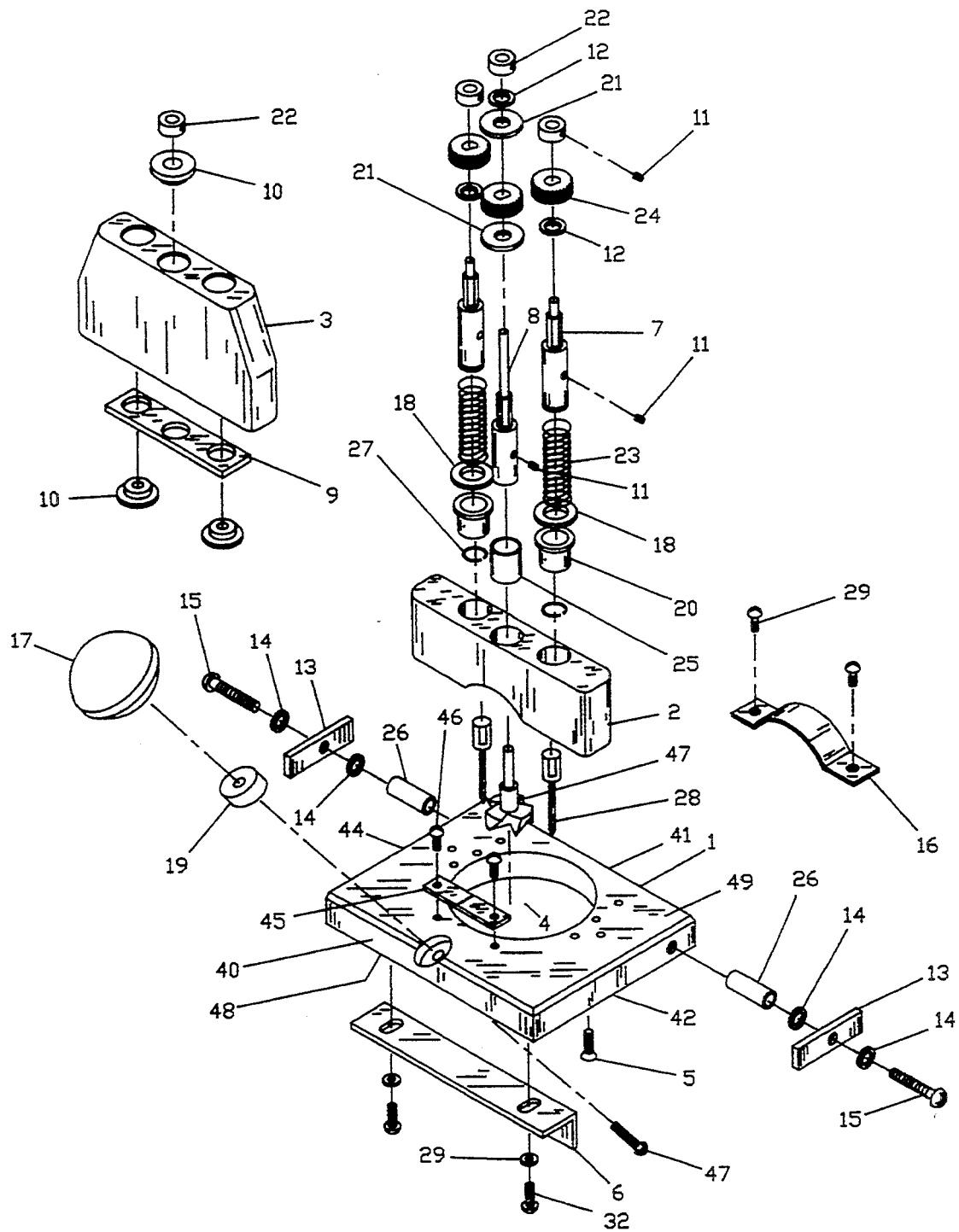
FIG. 1 is an exploded perspective view of the hinge drilling tool.
Figure 2:
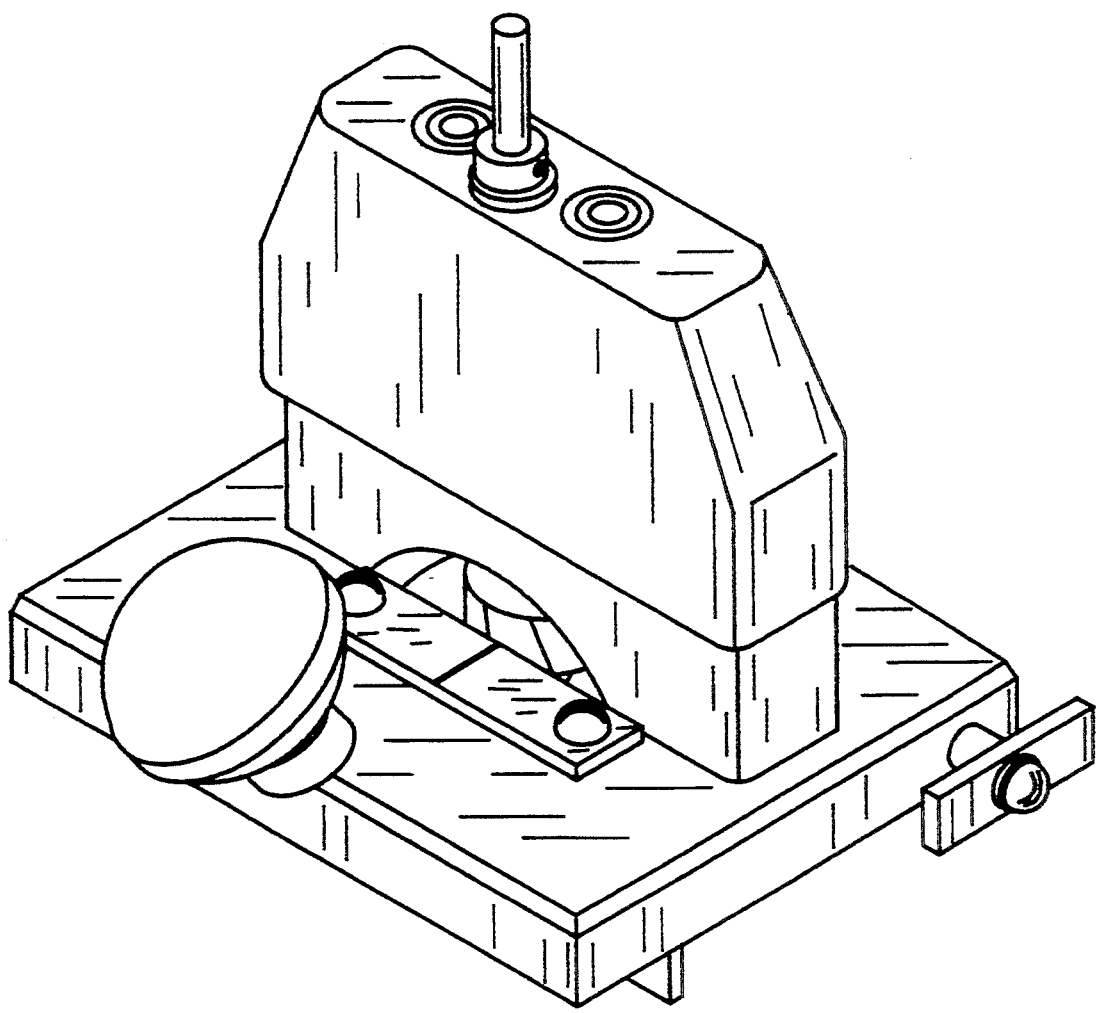
FIG. 2 is a perspective view of the assembled hinge drilling tool.

Referring to FIG. 1, Numeral 1 designates the hinge drilling tool base having a drill bit clearance hole 4 roughly center, an adjustable guide fence 6 with attachment screws 32 and lock washer 29, fixing guide fence 6 to the bottom surface of the base 1 roughly parallel to back base edge 40. Two intermittent turnstops 13 with attachment screws 15 and anti-friction washers 14 are on opposite base edges 42 and 44. A handle 17 is centered on back edge 40 positioned approximately at a 45° angle with spacer 19 and attachment screw 47. A center locating window 45 is held to base 1 with attachment screws 46, located on the top surface of base 1 and projecting over clearance hole 4 and set in from edge 40 a distance greater than the adjustment range of guide fence 6, so that guide fence 6 cannot impair the view through center window 45. A bridge piece 2 spanning clearance hole 4 is attached to base 1 with screw 5 through holes in base 1, bridge piece 2 housing bearings 20 and 25. Drive shaft/bit holder 8 has flats on its shank for attachment to an electric drill motor. Bit holder 8 has set screw 11 to retain a boring bit, and bit holder 8 passes through beating 25, washer 21, gear 24, washer 21 being retained by collar 22. Washer 21 is of a size to overlap and capture gears 24 on bit holders 7. Gears 24 are the same thickness. Bit holder 7 passes through washer 18, and bearing 20, which is retained by spring ring 27. Bit holder 7 is surrounded by spring 23, washer 12, and a gear 24 and retained by collar 22 with set screw 11. Bit holder 7 is provided with a set screw to retain a boring bit. Bit holders 7 are of such a length to go into and terminate with the upper surface of beating 10 located in hood 3. Bit holder 8 passes through beating 10. Hood 3 is retained by collar 22 on bit holder shank 8. The entire assembly of bit holders 7 and 8 is covered by hood 3, which is biased upward by springs 23.

Figure 3:
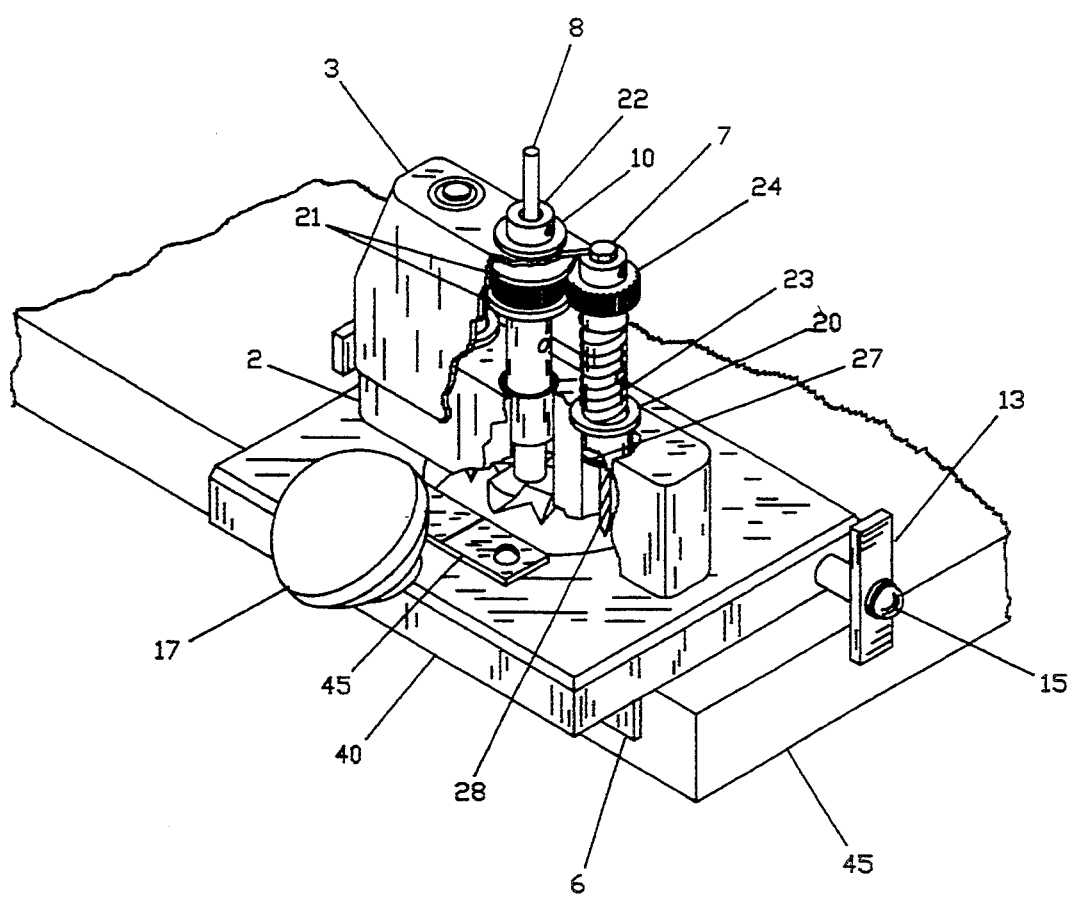
FIG. 3 is a cross sectional view of the hinge drilling tool.

Referring to FIG. 3, numeral 8 shows a projecting shaft for attachment to an electric drill motor hood 3 retained by collar 22. Washers 21 capture gear 24 to retain assembly when hood 3 is removed to install boring bits in bit holders 7 and 8, bit holders 7 and 8 being biased upwardly by springs 23. The bit holders 7 and 8 and hood 3 move downward when pressure is applied to the shank of bit holder 8, and the axial travel of bit holders 7 and 8 is determined by the full compression of spring 23. The hinge drilling tool is positioned on the corner of a work piece with guide fence 6 against the work piece edge and turnstop 13 against an adjacent edge of the work piece.

I claim:

1. A device for drilling a series of holes in the face of a workpiece relative to a first edge and second and third edges perpendicular to the first edge, comprising a generally rectangular base having an upper surface, a substantially flat bottom surface and a generally centrally positioned clearance hole for passage of a plurality of drill holders geared together and vertically movable on said base, a locating window located next to said clearance hole, said locating window having an alignment mark, said drill holders comprising a cylindrical shaft with attachment means to accept a boring bit, means for retracting said drill holders, a guide having a guide surface, said guide being adjustably mounted on the bottom surface of said base so that the distance between the drill holders and said first edge may be varied, two intermittent stop members being mounted on opposite parallel edges of said base and positioned to engage either of the second or third edges with stop surfaces, means mounting said stop members for independent positioning of each said stop surface in an operative position extending below the bottom surface of said base and an inoperative position wherein the stop surface may be fixed above said bottom surface, one of said cylindrical shafts having means engageable by a hand held motive means in order to rotate said drill holders, said intermittent stop members in combination with said guide establishing said device at either end of a workpiece.

* * * * *